Figure 1:
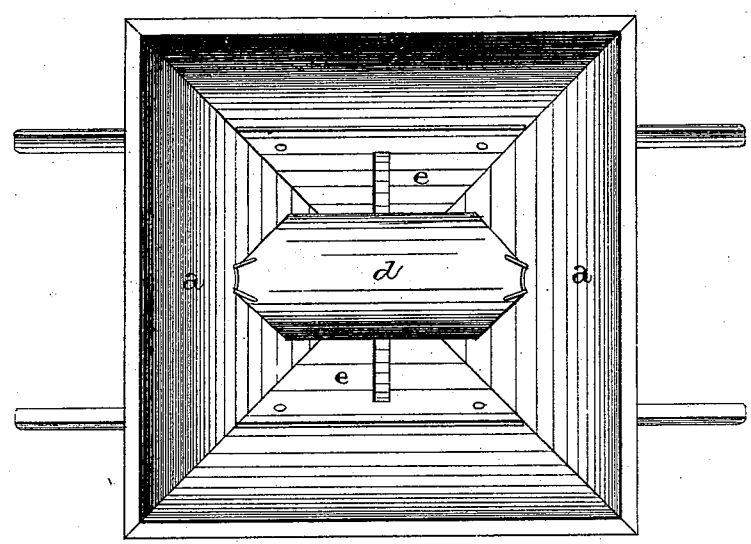
Figure 2:
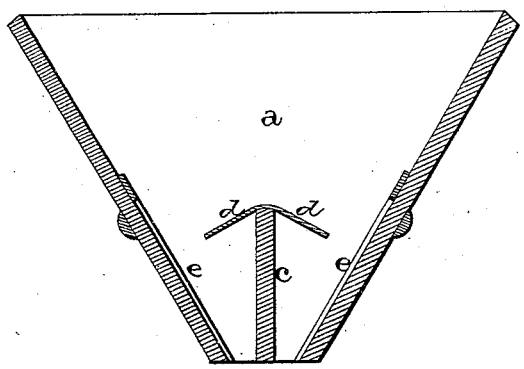

W. A. KING.
MAGNETIC PROTECTOR FOR COFFEE AND SPICE MILLS.

No. 189,046. Patented April 3, 1877.

WITNESSES:
J. Wm Garner
Albert J. de Zeyk

INVENTOR:
W. A. King
per
F. A. Lehmann, Atty

UNITED STATES PATENT OFFICE.

WILLIAM A. KING, OF DETROIT, MICHIGAN.

IMPROVEMENT IN MAGNETIC PROTECTORS FOR COFFEE AND SPICE MILLS.

Specification forming part of Letters Patent No. 189,046, dated April 3, 1877; application filed February 7, 1877.

*To all whom it may concern:*

Be it known that I, WILLIAM A. KING, of Detroit, in the county of Wayne and State of Michigan, have invented certain new and useful Improvements in Coffee and Spice Mill Protectors; and I do hereby declare the following to be a full, clear, and exact description of the invention, such as will enable others skilled in the art to which it pertains to make and use it, reference being had to the accompanying drawings, which form part of this specification.

My invention relates to an improvement in coffee and spice mills; and it consists in arranging magnetic plates in the bottom of the hopper, so as to catch the pieces of nails, tacks, or iron that may have accidentally gotten into the material being ground, and thus prevent them from getting into the operating parts of the mill and ruining them, as will be more fully described hereinafter.

The accompanying drawings represent my invention.

$a$ represents the hopper of a coffee, spice, or any similar mill, and which may be of any shape, size, or construction desired. The bottom of this hopper is divided by the partition $c$, so as to form two discharges, through which the material being ground falls upon the grinding mechanism. Upon the top of this partition is placed the curved shield $d$, which divides the material, and throws it out against the sides of the hopper. To these sides are secured the magnetized metallic plates or other equivalent devices $e$, which attract the pieces of iron, nails, or tacks that so frequently get into the materials that are ground in the mill, and, passing down into the grinding mechanism, either injure or ruin them, or stop the mill and cause a great deal of trouble and inconvenience to extract them.

I do not confine myself to the form of plates here shown, but vary them according to circumstances, my whole object being to so arrange magnets in or around the discharges as to catch the iron that may be in the material being ground and hold it, while the material passes on through the mill.

Having thus described my invention, I claim—

1. In combination with a hopper or other receptacle of a mill through which the material to be ground passes, a magnet or magnets, or magnetic substances arranged around or in the discharge, substantially as shown.

2. The combination of the hopper $a$ and magnetic plates $e$, arranged in the bottom thereof, substantially as described.

3. The combination of the hopper $a$, magnetic plates $e$, and shield $d$, substantially as set forth.

In testimony that I claim the foregoing I have hereunto set my hand this 29th day of January, 1877.

WILLIAM A. KING.

Witnesses:
JULIAN G. DICKINSON,
OLIVER M. LEONARD.